US010899228B2

United States Patent
Shigefuji et al.

(10) Patent No.: US 10,899,228 B2
(45) Date of Patent: Jan. 26, 2021

(54) REAR VIEW MONITORING DEVICE

(71) Applicant: HONDA MOTOR CO., LTD., Tokyo (JP)

(72) Inventors: Yasuyuki Shigefuji, Wako (JP); Akinori Myoi, Wako (JP); Susumu Seki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/583,297

(22) Filed: Sep. 26, 2019

(65) Prior Publication Data
US 2020/0114762 A1 Apr. 16, 2020

(30) Foreign Application Priority Data
Oct. 12, 2018 (JP) .................. 2018-193445

(51) Int. Cl.
*B60K 37/02* (2006.01)
*B60R 11/04* (2006.01)
*B60R 1/00* (2006.01)

(52) U.S. Cl.
CPC ............ *B60K 37/02* (2013.01); *B60R 1/00* (2013.01); *B60R 11/04* (2013.01); *B60K 2370/152* (2019.05); *B60K 2370/80* (2019.05); *B60R 2300/101* (2013.01); *B60R 2300/802* (2013.01)

(58) Field of Classification Search
CPC ............ B60K 37/02; B60K 2370/152; B60R 2300/802; B60R 1/00; B60R 11/04
USPC ........................................................ 340/438
See application file for complete search history.

(56) References Cited

U.S. PATENT DOCUMENTS

| 4,837,551 | A * | 6/1989 | Iino | G01P 1/08 340/461 |
| 8,339,526 | B2 * | 12/2012 | Minikey, Jr. | B60R 1/12 349/11 |
| 9,094,745 | B2 * | 7/2015 | Suzuki | H04R 5/02 |
| 9,168,869 | B1 * | 10/2015 | Kamal | G02B 27/0101 |

(Continued)

FOREIGN PATENT DOCUMENTS

| JP | 11-255020 | 9/1999 |
| JP | 2010-188903 | 9/2010 |

(Continued)

OTHER PUBLICATIONS

German Office Action for German Patent Application No. 102019215481.6 dated Mar. 13, 2020.

*Primary Examiner* — John A Tweel, Jr.
(74) *Attorney, Agent, or Firm* — Amin, Turocy & Watson, LLP

(57) ABSTRACT

A rear view monitoring device includes: a display unit which is provided on both sides of an instrument panel in a vehicle width direction; and a housing formed to surround a periphery of the display unit, wherein the housing includes an opening portion formed on a display surface side of the display unit, an upper surface disposed above the display unit, a side surface disposed outside the display unit in the vehicle width direction, and an overhanging portion which straddles the upper surface and the side surface and overhangs outward in the vehicle width direction from a range in which a pillar projects in a vertical direction, and at least the overhanging portion is formed to have a downward gradient toward an outside in the vehicle width direction.

12 Claims, 6 Drawing Sheets

(56) References Cited

U.S. PATENT DOCUMENTS

| 10,325,966 | B2* | 6/2019 | Isa | H01L 51/003 |
| 2012/0314075 | A1* | 12/2012 | Cho | B60R 1/00 |
| | | | | 348/148 |
| 2019/0084422 | A1* | 3/2019 | Iwao | B60K 37/02 |

FOREIGN PATENT DOCUMENTS

| JP | 2016-124393 | 7/2016 |
| WO | 2019/009321 | 1/2019 |

* cited by examiner

REARWARD ←→ FRONTWARD

REAR VIEW MONITORING DEVICE

CROSS-REFERENCE TO RELATED APPLICATION

Priority is claimed on Japanese Patent Application No. 2018-193445, filed on Oct. 12, 2018, the contents of which are incorporated herein by reference.

BACKGROUND

Field of the Invention

The present invention relates to a rear view monitoring device.

Background

In recent years, a technology using a camera monitoring system (CMS) has been proposed as a rear view monitoring device which replaces a door mirror for a vehicle (refer to, for example, Japanese Unexamined Patent Application, First Publication No. 2016-124393). The camera monitoring system displays an external image captured by a camera on a display unit (a display) provided in a vehicle passenger compartment. A driver checks behind the vehicle by looking at the image displayed on the display unit.

The camera monitoring system of this system can be miniaturized as compared to the door mirror, safety can be improved and wind noise can be reduced.

It is conceivable to dispose display units on both sides of an instrument panel in a vehicle width direction so that the driver can use the camera monitoring system without discomfort as in the conventional door mirror. It is possible to prevent a line of sight along which a conventional door mirror is viewed and a line of sight along which the display unit of the camera monitoring system is viewed from changing as much as possible through such a configuration. Further, it is conceivable to dispose the display unit outside of the instrument panel as far as possible in the vehicle width direction so that a part of the display is not obscured by the driver's hands, arms or the steering wheel.

SUMMARY

However, in the above-described related art, when it is intended to dispose the display unit as far as possible away in the vehicle width direction, a part of the rear view monitoring device may protrude outward from an opening of a side window (an outer panel) and, for example, raindrops may become attached to the rear view monitoring device when it rains. There are some cases in which the raindrops enter the inside of the rear view monitoring device and a failure occurs in the rear view monitoring device.

An aspect of the present invention provides a rear view monitoring device in which raindrops are able to drain away quickly without accumulation of attached raindrops and the like and in which an operation thereof is stable.

A rear view monitor device according to an aspect of the present invention includes: a display unit which is provided on both sides of an instrument panel of a vehicle in a vehicle width direction and displays a captured external image to a driver; and a housing which is formed to surround a periphery of the display unit, wherein the housing includes an opening portion formed on a display surface side of the display unit, an upper surface disposed above the display unit, a side surface which is disposed outside the display unit in the vehicle width direction and faces the outside, and an overhanging portion which straddles the upper surface and the side surface, extends above the instrument panel and overhangs outward in the vehicle width direction from a range in which a pillar configured to constitute a part of a portion of the vehicle on a side in the vehicle width direction projects in a vertical direction, and at least the overhanging portion is formed to have a downward gradient toward an outside in the vehicle width direction.

The overhanging portion which overhangs outward in the vehicle width direction from the range in which the pillar projects in the vertical direction is particularly easily exposed to rainwater, and raindrops are likely to adhere to the overhanging portion. Since such an overhanging portion is formed to have a downward gradient toward the outside in the vehicle width direction, the raindrops adhering to the overhanging portion can be quickly discharged without remaining on the overhanging portion. Accordingly, the possibility of the raindrops entering the inside of the housing can be reduced, and an operation of the rear monitoring device can be stabilized.

In the rear view monitoring device, the overhanging portion may be formed to be curved, and a connecting portion between the overhanging portion and the upper surface may be located inward in the vehicle width direction from an outermost side of the projection range of the pillar in the vehicle width direction.

With such a configuration, a radius of curvature of the overhanging portion formed to be curved can be made as large as possible. It is possible to promote smooth discharge of the raindrops, to miniaturize the entire housing and to improve a design by increasing the radius of curvature.

In the rear view monitoring device, the display unit may be located inward in the vehicle width direction from the outermost side of the projection range of the pillar in the vehicle width direction.

With such a configuration, the possibility of the raindrops adhering to the display unit can be reduced as much as possible.

In the rear view monitoring device, an end portion of each of the upper surface and the side surface of the housing on an opening portion side may be formed to gradually turn toward the display unit side from a front of the vehicle toward a rear of the vehicle.

The pillar extends to gradually turn inward in the vehicle width direction toward the rear of the vehicle. That is, a portion of the housing which overhangs outward in the vehicle width direction becomes larger than the range in which the pillar projects in the vertical direction (hereinafter, simply referred to as a projection range of the pillar) as it moves toward the rear of the vehicle. However, the portion in which the housing overhangs outward from the projection range of the pillar in the vehicle width direction can be made as small as possible by forming the end portion of each of the upper surface and side surface of the housing on the opening side to gradually turn toward the display unit side toward the rear of the vehicle. Thus, it is possible to minimize the possibility of the raindrops adhering to the housing. Further, it is possible to prevent the raindrops from entering the inside of the housing as much as possible and to stabilize an operation of the rear monitoring device.

In the rear view monitoring device, the housing may include a housing main body which covers the display unit from the front of the vehicle, and a rim portion which is integrally provided at the housing main body on a rear side of the housing main body and forms the opening portion, and an outer surface of the rim portion may be formed to gradually turn toward the display unit side from the front of the vehicle toward the rear of the vehicle.

In this way, a degree of freedom in designing the gradient of the housing main body and the gradient of the rim portion can be increased by dividing the housing into a two-divided constitution of the housing main body and the rim portion. Further, moldability of the housing with a resin can be improved.

According to the aspect of the present invention, it is possible for raindrops attached to a protruding portion to drain away quickly without the raindrops accumulating on the protruding portion. Thus, the likelihood that raindrops will enter the inside of a housing can be reduced, and an operation of the rear view monitoring device can be stabilized.

DESCRIPTION OF EMBODIMENTS

Next, an embodiment of the present invention will be described on the basis of the drawings.

Figure 1:
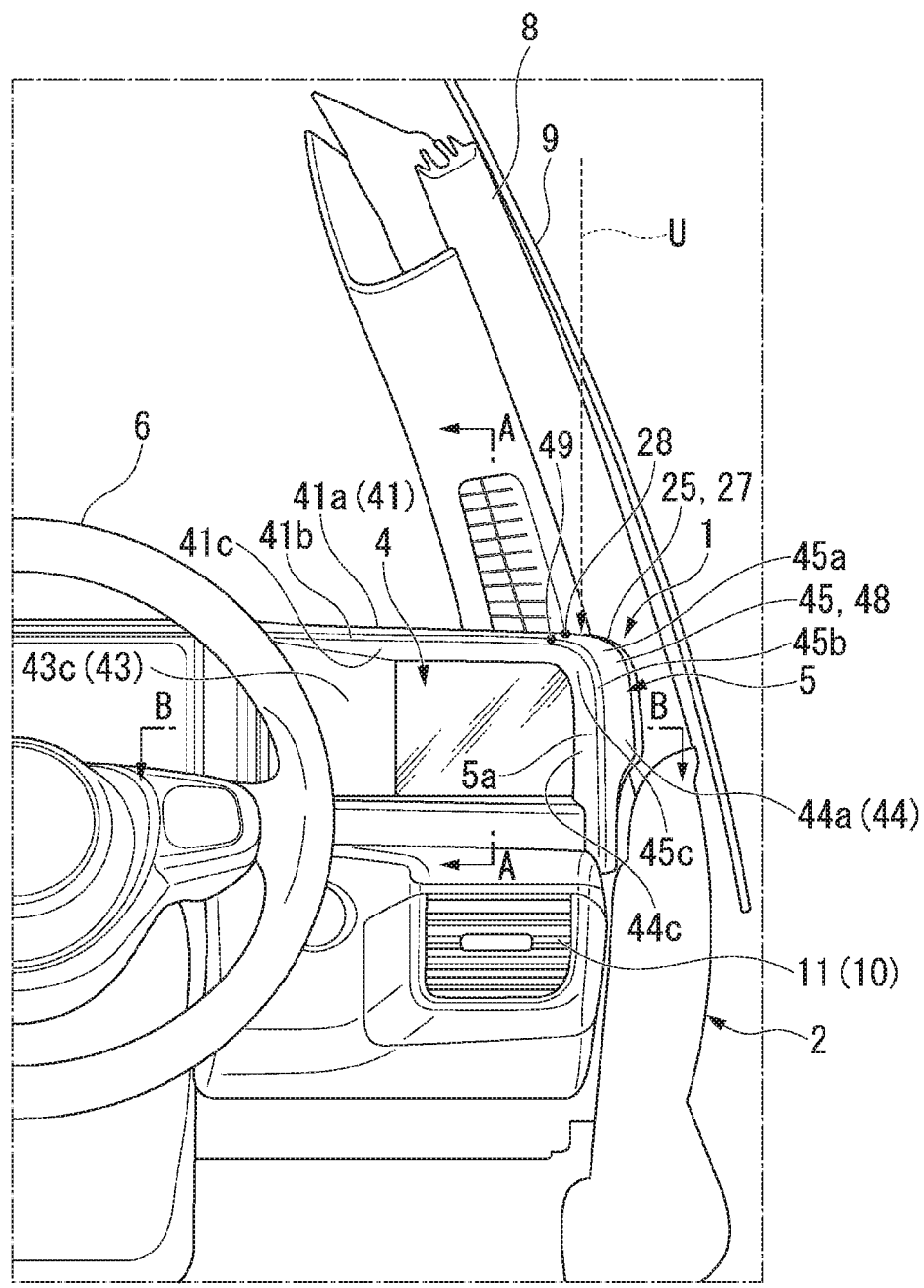
FIG. 1 is a view of a camera monitoring system according to an embodiment of the present invention when seen from the driver seat side of a vehicle.

FIG. 1 is a view of a camera monitoring system 1 (a rear view monitoring device) when seen from the driver seat side of a vehicle 2.

The camera monitoring system 1 is provided on both sides of the vehicle 2 in a vehicle width direction. Only the driver seat side is shown in FIG. 1. However, the camera monitoring system 1 is also provided on the passenger seat side. The basic configurations of these two camera monitoring systems 1 are the same. The two camera monitoring systems 1 are disposed in line symmetry with respect to a center in the vehicle width direction. In the following description, only the camera monitoring system 1 on the driver seat side will be described, and the description of the camera monitoring system 1 on the passenger seat side will be omitted. However, portions on the driver seat side and the passenger seat side which may have different configurations will be separately described.

Further, in the following description, forward and rearward in a traveling direction of the vehicle 2 will be simply referred to as forward and rearward. Moreover, upward and downward of a vertical direction may be referred to simply as upward and downward. In addition, a direction perpendicular to the vertical direction may be referred to as a horizontal direction.

(Vehicle)

First, the vehicle 2 will be described.

The vehicle 2 includes, in addition to an instrument panel 3, a steering wheel 6 disposed on the driver seat side and provided behind the instrument panel 3, and a front pillar 7 which constitutes a vehicle width direction side portion of the vehicle. The front pillar 7 (a pillar) extends obliquely upward from a front of the instrument panel 3 toward a rear thereof. Further, the front pillar 7 extends slightly obliquely inwards into a vehicle compartment from the front toward the rear.

The front pillar 7 also constitutes a part of a frame of a side door 9 provided at the front pillar 7 to perform an opening and closing operation. When the side door 9 is closed, it is closed in a state in which a weather strip 8 mounted to the front pillar 7 is slightly compressed. Thus, sealability between the front pillar 7 and the side door 9 is secured. In the embodiment, the term "front pillar 7" also includes the weather strip 8 mounted on the front pillar 7.

(Camera Monitoring System)

Figure 2:
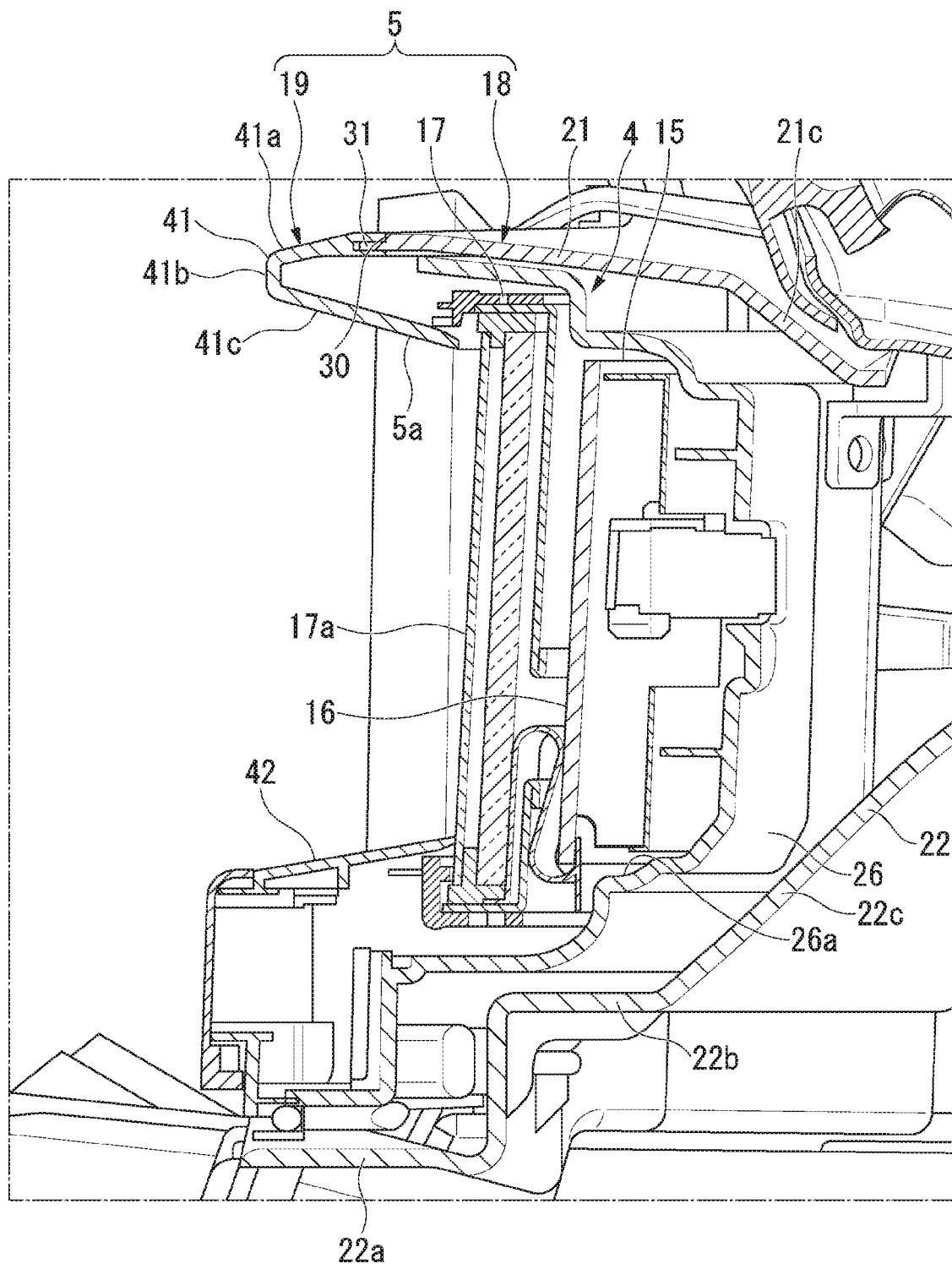
FIG. 2 is a cross-sectional view taken along line A-A of FIG. 1.

FIG. 2 is a cross-sectional view taken along line A-A of FIG. 1.

As shown in FIGS. 1 and 2, the camera monitoring system 1 includes a display device 4 provided on both sides of the instrument panel 3 in the vehicle width direction and on the upper side, and a housing 5 formed to surround the periphery of the display device 4. For example, an air outlet 11 of a car air conditioner 10 is provided below the camera monitoring system 1 of the instrument panel 3.

(Display Device)

The display device 4 includes a display unit 17, and a control part 15 disposed in front of the display unit 17. The display unit 17 displays an external image taken by a rear camera (not shown) provided on an outer side surface (for example, a side surface (not shown) of the side door) of the vehicle 2 in the vehicle width direction to a driver. The driver visually recognizes the image displayed on a display 12 through a cover 13. That is, a rear surface of the cover 13 becomes a display surface 17a of the display unit 17.

Figure 3:
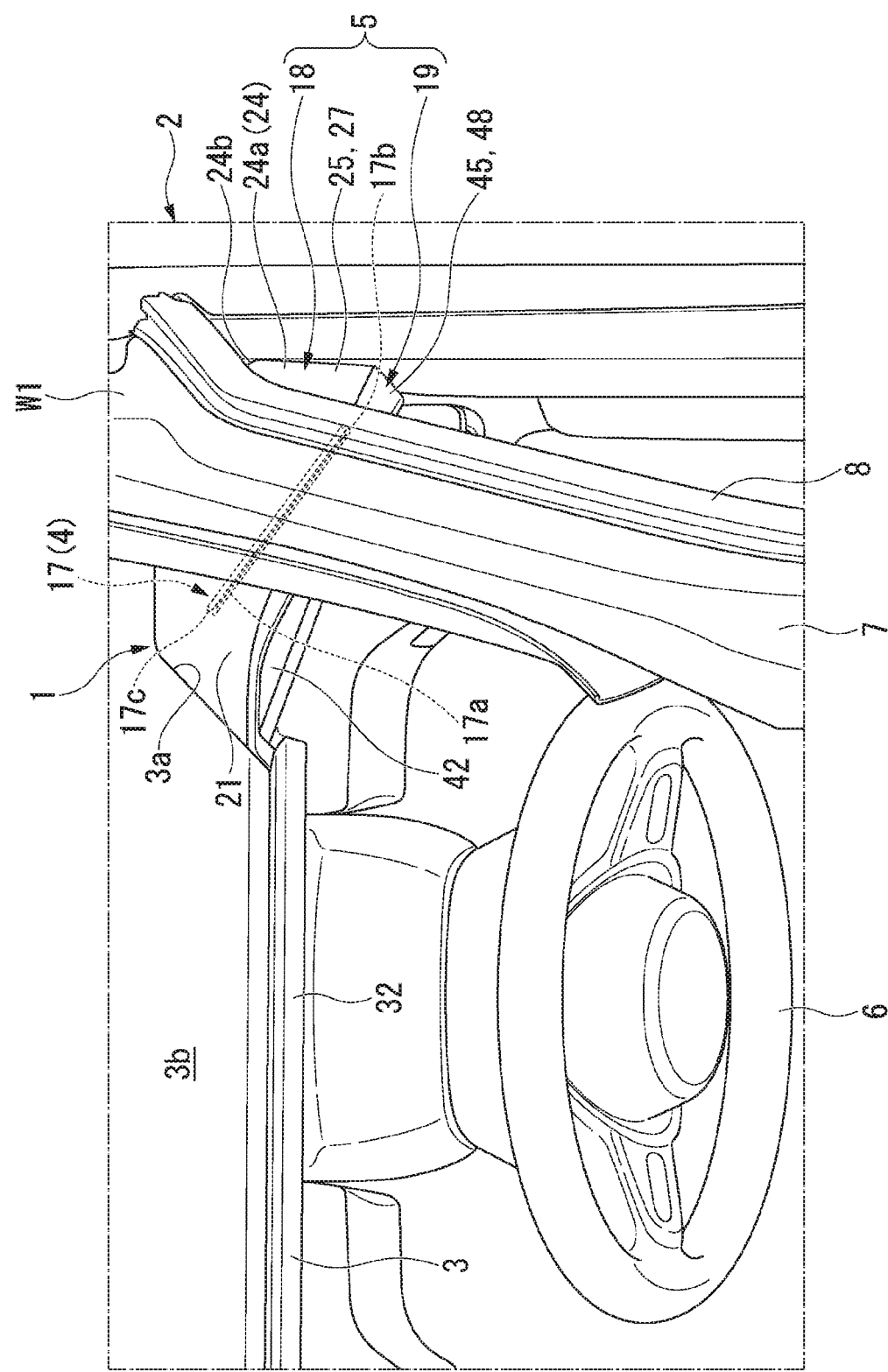
FIG. 3 is a view of the camera monitoring system according to the embodiment when seen from the directly upper side (the upper side in a vertical direction).
Figure 4:
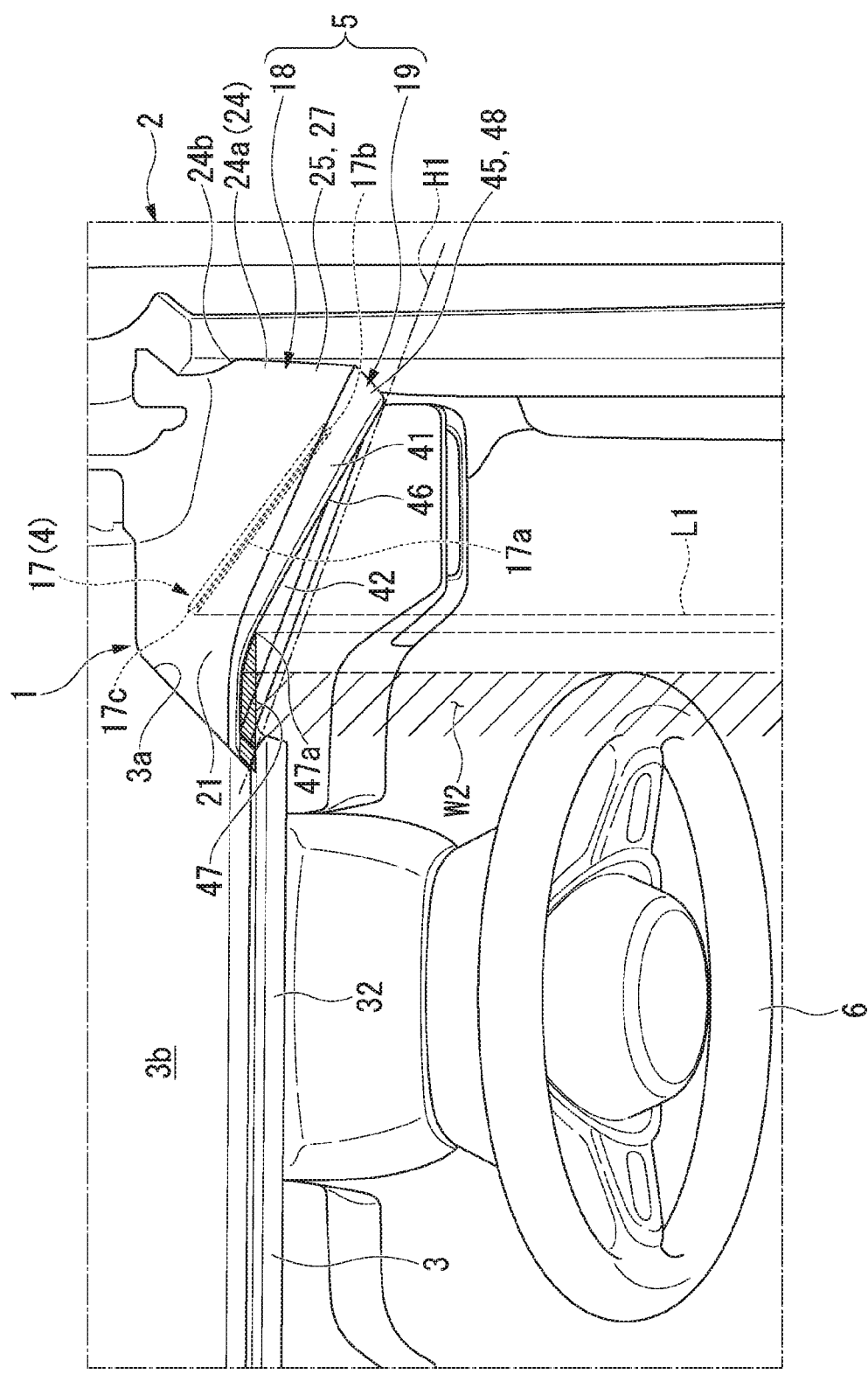
FIG. 4 is a view of the camera monitoring system according to the embodiment when seen from the directly upper side (the upper side in the vertical direction), wherein a front pillar is omitted.

FIG. 3 is a view of the camera monitoring system 1 when seen from the directly upper side (the upper side in the vertical direction). FIG. 4 is a view in which the front pillar 7 of FIG. 3 is omitted.

As shown in FIG. 3 and FIG. 4, the display device 4 is disposed obliquely so that the display surface 17a of the display unit 17 faces the driver side. That is, the display surface 17a is disposed obliquely to gradually turn rearward as it moves outward in the vehicle width direction.

The display unit 17 is located inward in the vehicle width direction from the outermost side of the projection range W1 of the front pillar 7 in the vehicle width direction. In other words, when the camera monitoring system 1 is seen from the directly upper side, an outer end 17b of the display unit 17 in the vehicle width direction is located inward in the vehicle width direction from the outermost side of the front pillar 7 in the vehicle width direction.

Further, the display unit 17 is located outward in the vehicle width direction from a range W2 (hereinafter, simply referred to as a projection range W2 of the steering wheel 6) in which the steering 6 projects in a forward and rearward direction. In other words, when the camera monitoring system 1 is seen from the rear, an inner end 17c of the display unit 17 in the vehicle width direction is located outward in the vehicle width direction from the outermost side of the steering wheel 6 in the vehicle width direction.

Returning to FIG. 2, the control part 15 displays an image taken by a rear camera (not shown) on the display 12. The control part 15 includes a board 16 on which an element such as a central processing unit (CPU) is mounted. The image taken by the rear camera (not shown) is operationally processed by the element and output to the display unit 17.
(Housing)

Figure 5:
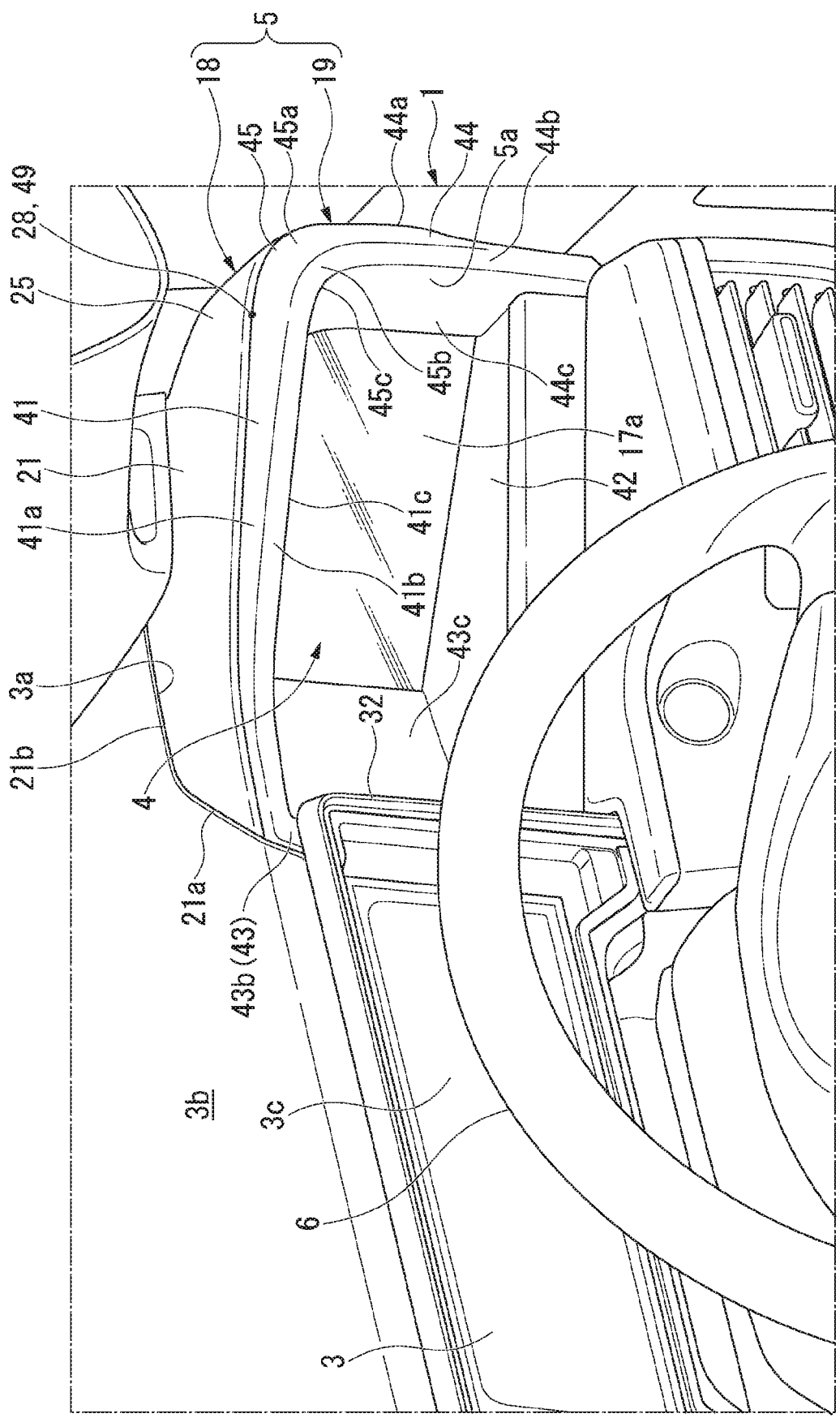
FIG. 5 is a perspective view of the camera monitoring system according to the embodiment when seen from the driver seat side.
Figure 6:
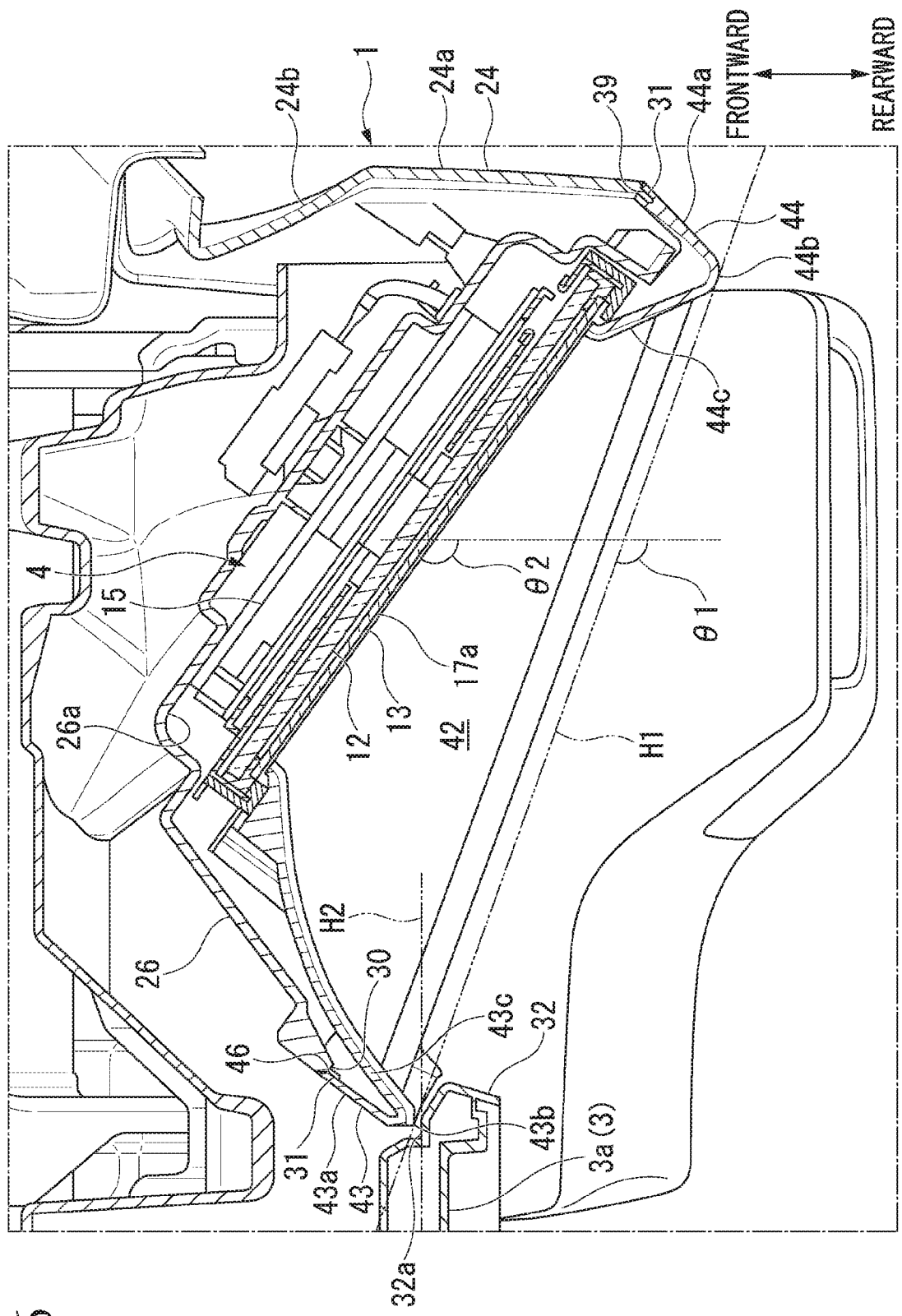
FIG. 6 is a cross-sectional view taken along line B-B of FIG. 1.

FIG. 5 is a perspective view of the camera monitoring system 1 when seen from the driver seat side. FIG. 6 is a cross-sectional view taken along line B-B in FIG. 1.

As shown in FIGS. 2 and 4 to 6, the housing 5 is accommodated in an accommodation concave portion 3a formed outside the instrument panel 3 in the vehicle width direction. The housing 5 is formed of, for example, a resin. The housing 5 includes a housing main body 18 which covers the upper side of the display device 4 and the outward side with respect to the vehicle, and a visor rim portion 19 (an end portion, a rim portion) which is fitted to the rear side of the housing main body 18 and forms an opening portion 5a of the housing 5. The housing 5 is disposed obliquely to correspond to a direction of the display device 4 (the display surface 17a) such that the opening portion 5a faces slightly inward in the vehicle width direction from the outside in the vehicle width direction.

(Housing Main Body)

The housing main body 18 is formed in an L shape when seen from the opening portion 5a side. That is, the housing main body 18 includes an upper surface 21 which is located above the display device 4 and extends in the horizontal direction, an outer side surface 24 (a side surface) which is located outside the display device 4 in the vehicle width direction and extends in the vertical direction, a curved surface 25 straddling the outer side surface 24 and the upper surface 21, and a rear cover 26 which is located inside the upper surface 21, the outer side surface 24 and the curved surface 25.

As shown in detail in FIGS. 2 and 6, the rear cover 26 supports the display device 4. The rear cover 26 is formed in a box shape (a bowl shape) of which a rear is open. The rear cover 26 is formed to correspond to a shape and an arrangement direction of the display device 4 such that an opening area becomes smaller through a step toward the front. The display device 4 is accommodated in an inner surface 26a of the rear cover 26 constituted as described above.

The outer side surface 24 is exposed from the instrument panel 3. As for the outer side surface 24, a rear portion 24a on the rear side from a center in the forward and rearward direction extends in the forward and rearward direction. The front side of the outer side surface 24 from the center in the forward and rearward direction is formed obliquely to gradually turn toward the display device 4 side as it goes toward the front. A seal lip (not shown) of the side door 9 is located on the side in front of the outer side surface 24 from the center in the forward and rearward direction.

As shown in detail in FIG. 2, a lower surface 22 has a first surface 22a disposed on the opening portion 5a side. A second surface 22b located above the first surface 22a is integrally formed at a front end of the first surface 22a via a step. In addition, an inclined portion 22c which extends obliquely to gradually turn upward as it goes toward the front is integrally formed at a front end of the second surface 22b.

As shown in detail in FIG. 4, the upper surface 21 is exposed from the instrument panel 3.

The upper surface 21 is located on substantially the same plane as an upper surface 3b of the instrument panel 3 (also refer to FIG. 1). One side inside the upper surface 21 is formed to correspond to a shape of the accommodation concave portion 3a of the instrument panel 3. That is, one side of the upper surface 21 is formed obliquely so that a rear side 21a on the rear side from the center in the forward and rearward direction gradually turns toward the display device 4 side as it goes toward the front.

Among sides of the upper surface 21, a front side 21b on the side in front of the center in the forward and rearward direction is formed so that an inclination angle with respect to the forward and rearward direction is larger than that of the rear side 21a. Accordingly, the instrument panel 3 and the upper surface 21 are arranged and disposed with almost no gap.

Further, as shown in detail in FIG. 2, the upper surface 21 is formed to have a gradually downward gradient toward the front. A front portion 21c of the upper surface 21 is bent and extends downward so that the inclination with the downward gradient further increases.

As shown in FIGS. 1 and 5, the curved surface 25 which straddles the outer side surface 24 and the upper surface 21 is formed in a substantially arc shape when seen in the forward and rearward direction to have a downward gradient from the upper surface 21 toward the outer side surface 24.

The camera monitoring system 1 is disposed outside the instrument panel 3 as far as possible in the vehicle width direction. Therefore, as shown in detail in FIG. 3, when the camera monitoring system 1 is seen from the directly upper side, a part of the curved surface 25 overhangs outward further than the front pillar 7 in the vehicle width direction. In other words, the curved surface 25 has a first overhanging portion 27 (an overhanging portion) which overhangs outward further than the projection range W1 of the front pillar 7 in the vehicle width direction.

That is, the first overhanging portion 27 is formed to have a downward gradient toward the outside in the vehicle width direction. Further, the curved surface 25 is connected to the upper surface 21, and a connecting portion 28 (refer to FIG. 1) between the upper surface 21 and the curved surface 25 is located inward in the vehicle width direction from the outermost side of the projection range W1 of the front pillar 7 in the vehicle width direction. That is, on the upper surface 21 side of the housing main body 18, the downward gradient starts further inward in the vehicle width direction than the outermost side of the projection range W1 of the front pillar 7 in the vehicle width direction, and the downward gradient continues to the outer side surface 24 as is.

The housing main body 18 constituted as described forms an edge portion 30 including a side edge of the upper surface 21 on the opening portion 5a side, a side edge of the outer side surface 24 on the opening portion 5a side, and a side edge of the curved surface 25 on the opening portion 5a side when seen from the rear.

As shown in detail in FIGS. 2 and 6, a fitting convex portion 31 which fits and fixes the visor rim portion 19 is formed at positions on a peripheral edge of the edge portion 30 corresponding to the upper surface 21, the outer side surface 24, and the curved surface 25.

(Visor Rim Portion)

As shown in FIGS. 2, 5 and 6, the visor rim portion 19 is formed to protrude from the edge portion 30 of the housing main body 18 toward the rear. The visor rim portion 19 forms the opening portion 5a of the housing 5. That is, the visor rim portion 19 forms the opening portion 5a having a frame shape in which an upper rim portion 41 located above the display device 4, a lower rim portion 42 located below the display device 4, an inner rim portion 43 located inside the display device 4 in the vehicle width direction, an outer rim portion 44 located outside the display device 4 in the vehicle width direction, and a curved rim portion 45 which straddles the upper rim portion 41 and the outer rim portion 44 are connected to correspond to the housing main body 18. Further, the visor rim portion 19 serves as a visor so that light from outside does not easily reflect on the display surface 17a of the display device 4.

Among the rim portions 41 to 45 of the visor rim portion 19, each of the upper rim portion 41, the inner rim portion 43, the outer rim portion 44, and the curved rim portion 45 has substantially a V shape in section.

That is, the upper rim portion 41 is formed by continuously and integrally forming an outer side surface 41a (an outer surface) which extends obliquely downward toward the display device 4 side (the inside of the opening portion 5a) as it goes rearward from the upper surface 21 of the housing main body 18, a bent portion 41b having a shape which is folded back forward from a rear end of the outer side surface 41a, and an inner side surface 41c which extends obliquely downward toward the display device 4 side as it goes from an end of the bent portion 41b opposite to the outer side surface 41a to the display surface 17a of the display device 4.

The inner rim portion 43 is formed by continuously and integrally forming an outer side surface 43a (an outer surface) which extends rearward from the rear cover 26 of the housing main body 18, a bent portion 43b having a shape which is folded back forward from a rear end of the outer side surface 43a, and an inner side surface 43c which is curved and extends toward the display device 4 side as it goes from an end of the bent portion 43b opposite to the outer side surface 43a to the display surface 17a of the display device 4.

The outer rim portion 44 is formed by continuously and integrally forming an outer side surface 44a (an outer surface) which extends obliquely toward the display device 4 side (the inside of the opening portion 5a) as it goes rearward from the outer side surface 24 of the housing main body 18, a bent portion 44b having a shape which is folded back forward from a rear end of the outer side surface 44a, and an inner side surface 44c which extends obliquely toward the display device 4 side as it goes from an end of the bent portion 44b opposite to the outer side surface 44a to the display surface 17a of the display device 4.

The curved rim portion 45 is formed by continuously and integrally forming an outer side surface 45a (an outer surface) which extends obliquely toward the display device 4 side (the inside of the opening portion 5a) as it goes rearward from the curved surface 25 of the housing main body 18, a bent portion 45b having a shape which is folded back forward from a rear end of the outer side surface 45a, and an inner side surface 45c which extends obliquely toward the display device 4 side as it goes from an end of the bent portion 45b opposite to the outer side surface 45a to the display surface 17a of the display device 4. That is, the curved rim portion 45 has a second overhanging portion 48 (an overhanging portion) which overhangs outward from the projection range W1 of the front pillar 7 in the vehicle width direction.

The outer side surface 45a of the curved rim portion 45 is formed to correspond to the curved surface 25 of the housing main body 18. Thus, the outer side surface 45a of the curved rim portion 45 is formed in substantially an arc shape to have a downward gradient from the upper rim portion 41 toward the outer rim portion 44 when seen in the forward and rearward direction. That is, the second overhanging portion 48 is formed to have a downward gradient toward the outside in the vehicle width direction.

Further, the outer side surface 45a of the curved rim portion 45 is connected to the outer side surface 41a of the upper rim portion 41.

A connecting portion 49 (refer to FIG. 1) between the outer side surface 41a of the upper rim portion 41 and the outer side surface 45a of the curved rim portion 45 is located inward in the vehicle width direction from the outermost side of the projection range W1 of the front pillar 7 in the vehicle width direction. That is, on the upper rim portion 41 side of the visor rim portion 19, the downward gradient starts further inward in the vehicle width direction than the outermost side of the projection range W1 of the front pillar 7 in the vehicle width direction, and the downward gradient continues to the outer rim portion 44 as is.

In each of the outer side surfaces 41a and 43a to 45a of the rim portions 41 and 43 to 45, a fitting concave portion 39 which is fitted to the fitting convex portion 31 is formed in an end surface which is in contact with the housing main body 18. The visor rim portion 19 is positioned with respect to the housing main body 18 by fitting the fitting concave portion 39 to the fitting convex portion. Further, the outer surface of the housing main body 18 and the outer surface of the visor rim portion 19 are smoothly connected without gaps therebetween.

The bent portions 41b and 43b to 45b of the rim portions 41 and 43 to 45 constitute a rear edge of the visor rim portion 19. Since the housing 5 is disposed obliquely to correspond to an orientation of the display device 4 (the display surface 17a) such that the opening portion 5a is slightly directed from the outside in the vehicle width direction to the inside in the vehicle width direction, the rear edge of the visor rim portion 19 is also disposed obliquely. That is, the visor rim portion 19 is disposed to overhang toward the rear of the vehicle as it goes outward in the vehicle width direction. Therefore, the bent portion 44b of the outer rim portion 44 overhangs rearward of the bent portion 43b of the inner rim portion 43.

An inclination angle of the rear edge of the visor rim portion 19 with respect to the forward and rearward direction, that is, as shown in FIG. 6, an inclination angle θ1 with respect to the forward and rearward direction of a virtual plane H1 passing through the rear edges of the bent portion 43b of the inner rim portion 43 and the bent portion 44b of the outer rim portion 44 is smaller than an inclination angle θ2 with respect to the forward and rearward direction of the display surface 17a of the display device 4. Thus, the inner rim portion 43 is formed so that an extension length of the inner side surface 43c is longer than that of the outer side surface 43a.

Further, the housing 5 is disposed so that the bent portion 43b of the inner rim portion 43 is located in front of the instrument panel 3. More specifically, the bent portion 43b of the inner rim portion 43 is located in front of a frame body 32 constituting a screen 3c on which a speed indication or the like of the instrument panel 3 is displayed.

Hereinafter, a virtual plane H2 facing a front end surface 32a of the frame body 32 which is close to the rear edge of the bent portion 43b of the inner rim portion 43 will be referred to as a rear end of the instrument panel 3.

Relative to each of the rim portions 41, 43 to 45 of the visor rim portion 19 constituted in this way, the lower rim portion 42 of the visor rim portion 19 extends to be gradually directed obliquely upward from the rear toward the front and is formed to be flat. The inclination angle θ1 of the rear edge of the visor rim portion 19 with respect to the forward and rearward direction is smaller than the inclination angle θ2 of the display surface 17a of the display device 4 with respect to the forward and rearward direction. Therefore, the lower rim portion 42 is formed so that a width thereof in the forward and rearward direction gradually increases toward the inside in the vehicle width direction. A gap between the housing 5 and the display device 4 is closed by such a visor rim portion 19.

Returning to FIG. 4, a shape of the upper rim portion 41 of the visor rim portion 19 will be described in more detail.

As shown in FIG. 4, a first concave portion 46 is formed in the upper rim portion 41 so that a depth thereof gradually increases toward the front as it goes from an outer end in the vehicle width direction toward the inside in the vehicle width direction. More specifically, the rear edge of the bent portion 41b of the upper rim portion 41 is inclined forward with respect to the virtual plane H1 passing through the rear edge of the bent portion 43b of the inner rim portion 43 and the bent portion 44b of the outer rim portion 44 from an outer end in the vehicle width direction toward the inside in the vehicle width direction. This inclined portion is the first concave portion 46. A distance between the rear edge of the bent portion 41b of the upper rim portion 41 and the driver increases toward the inside in the vehicle width direction by forming the first concave portion 46.

Further, a second concave portion 47 is formed inside the upper rim portion 41 in the vehicle width direction except for a position corresponding to the inner rim portion 43 (except for an inner end portion in the vehicle width direction). That is, the second concave portion 47 is formed to be recessed forward with respect to the rear end (the virtual plane H2) of the instrument panel 3. The second concave portion 47 is smoothly connected to the first concave portion 46.

Furthermore, an outer end portion of the second concave portion 47 in the vehicle width direction, that is, a connecting portion 47a between the first concave portion 46 and the second concave portion 47 is located between the outside of the projection range W2 of the steering wheel 6 in the vehicle width direction and a virtual straight line L1 extending in the forward and rearward direction via the inner end 17c of the display unit 17 in the vehicle width direction. In addition, the virtual straight line L1 means an inner end portion of a range, in which the display unit 17 projects in the forward and rearward direction, in the vehicle width direction.

The second concave portion 47 is formed so that the projection range W2 of the steering wheel 6 is the deepest. Thus, a distance between a portion of the upper rim portion 41 in which the second concave portion 47 is formed and which is also within the projection range W2 of the steering wheel 6 and the driver is the longest.

(Operation of Housing)

Next, an operation of the housing 5 will be described.

The camera monitoring system 1 is provided on both sides of the instrument panel 3 in the vehicle width direction and on the upper side. Thus, a line of sight along which the conventional door mirror is viewed and a line of sight along which the display unit 17 of the camera monitoring system 1 is viewed do not change significantly. On the other hand, the housing 5 of the camera monitoring system 1 is easily exposed to raindrops because it is located outward in the vehicle width direction. In particular, raindrops are likely to adhere to a portion which protrudes outward of the front pillar 7 in the vehicle width direction. That is, as shown in FIGS. 1 and 3, in the housing 5, raindrops U are likely to adhere to each of the overhanging portions 27 and 48 which overhang outward from the projection range W1 of the front pillar 7 in the vehicle width direction.

However, the first overhanging portion 27 of the overhanging portions 27 and 48 is a part of the curved surface 25 formed in the housing main body 18 of the housing 5. Further, the second overhanging portion 48 of the overhanging portions 27 and 48 is a part of the curved rim portion 45 formed in the visor rim portion 19. The curved surface 25 and the curved rim portion 45 are formed to be curved and thus have a downward gradient toward the outside in the vehicle width direction. Accordingly, the raindrops U adhering to the overhanging portions 27 and 48 flow along the curved surface 25 or the curved rim portion 45 to the outer side surface 24 and the outer rim portion 44 and are discharged downward of the vehicle.

In addition, the curved rim portion 45 has the outer side surface 45a which extends obliquely toward the display device 4 side (the inside of the opening portion 5a) as it goes rearward from the curved surface 25 of the housing main body 18. Thus, in the visor rim portion 19, the second overhanging portion 48 which overhangs outward from the projection range W1 of the front pillar 7 in the vehicle width direction is minimized. Therefore, it is difficult for the raindrops U to adhere to the visor rim portion 19.

Further, since the camera monitoring system 1 is provided on both sides of the instrument panel 3 in the vehicle width direction and on the upper side, external light easily reflects on the display surface 17a of the display unit 17. However, since the housing 5 has a visor rim portion 19 that protrudes rearward, it is difficult for the external light to reflect on the display surface 17a of the display device 17.

When the visor rim portion 19 merely protrudes rearward, the driver may feel a sense of pressure, riding comfort in the driver seat may deteriorate, and a driver's hand may come into contact with the visor rim portion 19. However, since the first concave portion 46 and the second concave portion 47 are formed in the upper rim portion 41 of the visor rim portion 19, a distance between the rear edge of the bent portion 41b of the upper rim portion 41 and the driver can be ensured as much as possible. As a result, the riding comfort in the driver seat is improved, and the driver's hand does not easily come in contact with the visor rim portion 19.

Further, the first concave portion 46 is not simply recessed in the upper rim portion 41 but is inclined forward as it goes inward in the vehicle width direction from the outer end portion in the vehicle width direction. Thus, the upper rim portion 41 overhangs rearward of the vehicle on the outside of the visor rim portion 19 in the vehicle width direction, and a distance between the driver and the upper rim portion 41 increases therefrom toward the inside in the vehicle width direction. Therefore, it is difficult for the external light to reflect on the display surface 17a of the display unit 17 while the riding comfort in the driver seat is improved and the driver's hand is prevented from coming in contact with the visor rim portion 19.

In this way, the above-described camera monitoring system 1 includes the display device 4 provided on both sides of the instrument panel 3 in the vehicle width direction and on the upper side, and the housing 5 formed to surround the periphery of the display device 4. In the housing 5, each of the overhanging portions 27 and 48 which overhang outward from the projection range W1 of the front pillar 7 in the vehicle width direction is a part of each of the curved surface 25 and the curved rim portion 45. That is, each of the overhanging portions 27 and 48 has a downward gradient toward the outside in the vehicle width direction. Therefore, raindrops can be quickly discharged outside the vehicle without the raindrops remaining on the overhanging portions 27 and 48 on which the raindrops are likely to adhere.

Accordingly, the possibility of the raindrops entering the inside of the housing 5 can be reduced, and an operation of the camera monitoring system 1 can be stabilized.

Further, in the housing main body 18, the connecting portion 28 between the upper surface 21 and the curved surface 25 is located inward in the vehicle width direction from the outermost side of the projection range W1 of the front pillar 7 in the vehicle width direction. Furthermore, in the visor rim portion 19, the connecting portion 49 between the outer side surface 41a of the upper rim portion 41 and the outer side surface 45a of the curved rim portion 45 is located inward in the vehicle width direction from the outermost side of the projection range W1 of the front pillar 7 in the vehicle width direction. Thus, a radius of curvature of each of the curved surface 25 and the curved rim portion 45 (the overhanging portions 27 and 48) can be made as large as possible. The smooth discharge of the raindrops can be promoted, the entire housing 5 can be miniaturized, and the design can also be improved by increasing the radius of curvature.

Further, the display unit 17 is located inward in the vehicle width direction from the outermost side of the projection range W1 of the front pillar 7 in the vehicle width direction. In this way, the possibility of the raindrops adhering to the display unit 17 can be reduced as much as possible by locating the display unit 17 as far as possible from the outside in the vehicle width direction.

Further, the curved rim portion 45 of the visor rim portion 19 has the outer side surface 45a which extends obliquely toward the display device 4 side (the inside of the opening portion 5a) as it goes rearward from the curved surface 25 of the housing body 18. Thus, in the visor rim portion 19, the second overhanging portion 48 which overhangs outward from the projection range W1 of the front pillar 7 in the vehicle width direction is minimized. Therefore, it is possible to reduce the possibility of the raindrops U adhering to the visor rim portion 19 as much as possible. Also, it is possible to prevent the raindrops from entering the inside of the housing 5 as much as possible and to stabilize the operation of the camera monitoring system 1.

Further, the housing 5 is divided into the housing main body 18 and the visor rim portion 19. Additionally, the inclination angle (the gradient) of the entire outer surface of the housing main body 18 and the inclination angle (the gradient) of the entire outer surfaces 41a to 45a of the visor rim portion 19 are changed. In this way, by dividing the housing 5, it becomes easy to freely determine the respective inclination angles, and resin moldability of the housing 5 can be improved.

The present invention is not limited to the above-described embodiment and includes various modifications made to the above-described embodiment without departing from the scope of the present invention.

For example, in the above-described embodiment, the case in which the camera monitoring system 1 includes the display device 4 and the housing 5 formed to surround the periphery of the display device 4 has been described. However, the present invention is not limited thereto, and the camera monitoring system 1 may be an apparatus which can visually recognize the rear of the vehicle 2. For example, instead of the display device 4, a mirror may be used so that the rear of the vehicle 2 can be visually recognized.

Further, in the above-described embodiment, the case in which the camera monitoring system 1 is provided on both sides of the vehicle 2 in the vehicle width direction has been described. Additionally, the case in which the basic constitution of the two camera monitoring systems 1 is the same and the two camera monitoring systems 1 are disposed in line symmetry with respect to the center in the vehicle width direction has been described. That is, in the housing 5 on the passenger seat side, the first concave portion 46 and the second concave portion 47 are formed in the upper rim portion 41. However, the present invention is not limited thereto, and the first concave portion 46 or the second concave portion 47 formed in the upper rim portion 41 may be provided in only the camera monitoring system 1 on the driver seat side.

Further, in the above-described embodiment, the case in which the first concave portion 46 and the second concave portion 47 are formed in the upper rim portion 41 has been described. However, the present invention is not limited thereto, and it is sufficient that at least the first concave portion 46 is formed. Also in this case, good visibility of the display device 17 can be ensured, and the driver's hand catching on the visor rim portion 19 can be reduced without impairing the riding comfort in the driver seat.

Further, in the above-described embodiment, the case in which the first concave portion 46 formed in the upper rim portion 41 is formed to be inclined forward from the outer end portion in the vehicle width direction toward the inside in the vehicle width direction has been described. However, the present invention is not limited thereto, and the first concave portion 46 may be formed so that the depth thereof becomes gradually deeper forward as it goes from the outer end portion in the vehicle width direction toward the inside in the vehicle width direction. That is, the first concave portion 46 may be formed to be curved when seen from the upper side.

Further, in the above-described embodiment, the case in which, in the housing main body 18, the connecting portion 28 between the upper surface 21 and the curved surface 25 is located inward in the vehicle width direction from the outermost side of the projection range W1 of the front pillar 7 in the vehicle width direction has been described. Furthermore, the case in which, in the visor rim portion 19, the connecting portion 49 between the outer side surface 41a of the upper rim portion 41 and the outer side surface 45a of the curved rim portion 45 is located inward in the vehicle width direction from the outermost side of the projection range W1 of the front pillar 7 in the vehicle width direction has been described. However, the present invention is not limited thereto, and the curved surface 25 or the curved rim portion 45 may be formed so that at least each of the overhanging portions 27 and 48 has a downward gradient toward the outside in the vehicle width direction. Further, instead of the curved surface 25 or the curved rim portion 45, a flat inclined surface having a downward gradient may be used.

Further, in the above-described embodiment, the case in which the curved surface 25 or the curved rim portion 45 has a downward gradient has been described. However, the present invention is not limited thereto, and the upper surface 21 of the housing main body 18 and the outer surface 41a of the upper rim portion 41 may also have a downward gradient toward the outside in the vehicle width direction.

Further, in the above-described embodiment, the case in which the housing 5 is divided into the housing main body 18 and the visor rim portion 19 has been described. However, the present invention is not limited thereto, and the housing main body 18 and the visor rim portion 19 may be integrally formed.

What is claimed is:

1. A rear view monitoring device, comprising:
a display unit which is provided on both sides of an instrument panel of a vehicle in a vehicle width direction and displays, to a driver, a captured external image; and
a housing which is formed to surround a periphery of the display unit,
wherein the housing includes
an opening portion formed on a display surface side of the display unit,
an upper surface disposed above the display unit,
a side surface which is disposed outside the display unit in the vehicle width direction and faces the outside of the vehicle, and
an overhanging portion which straddles the upper surface and the side surface, extends above the instrument panel, and overhangs outward further than a pillar in the vehicle width direction, wherein the pillar is configured to constitute a part of a frame of a side door of the vehicle on the first side in the vehicle width direction and projects in a vertical direction, and
at least the overhanging portion is formed to have a downward gradient toward an outside of the vehicle in the vehicle width direction.

2. The rear view monitoring device according to claim 1, wherein the overhanging portion is formed to be curved, and
a connecting portion between the overhanging portion and the upper surface is located inward in the vehicle width direction from an outermost side of a projection range of the pillar in the vehicle width direction.

3. The rear view monitoring device according to claim 1, wherein the display unit is located inward in the vehicle width direction from an outermost side of a projection range of the pillar in the vehicle width direction.

4. The rear view monitoring device according to claim 2, wherein the display unit is located inward in the vehicle width direction from the outermost side of the projection range of the pillar in the vehicle width direction.

5. The rear view monitoring device according to claim 1, wherein an end portion of each of the upper surface and the side surface of the housing on an opening portion side is formed to gradually turn toward the display unit side from a front of the vehicle toward a rear of the vehicle.

6. The rear view monitoring device according to claim 2, wherein an end portion of each of the upper surface and the side surface of the housing on an opening portion side is formed to gradually turn toward the display unit side from a front of the vehicle toward a rear of the vehicle.

7. The rear view monitoring device according to claim 3, wherein an end portion of each of the upper surface and the side surface of the housing on an opening portion side is formed to gradually turn toward the display unit side from a front of the vehicle toward a rear of the vehicle.

8. The rear view monitoring device according to claim 4, wherein an end portion of each of the upper surface and the side surface of the housing on an opening portion side is formed to gradually turn toward the display unit side from a front of the vehicle toward a rear of the vehicle.

9. The rear view monitoring device according to claim 5, wherein the housing includes
a housing main body which covers the display unit from the front of the vehicle, and
a rim portion which is integrally provided at the housing main body on a rear side of the housing main body and forms the opening portion, and
an outer surface of the rim portion is formed to gradually turn toward the display unit side from the front of the vehicle toward the rear of the vehicle.

10. The rear view monitoring device according to claim 6, wherein the housing includes
a housing main body which covers the display unit from the front of the vehicle, and
a rim portion which is integrally provided at the housing main body on a rear side of the housing main body and forms the opening portion, and
an outer surface of the rim portion is formed to gradually turn toward the display unit side from the front of the vehicle toward the rear of the vehicle.

11. The rear view monitoring device according to claim 7, wherein the housing includes
a housing main body which covers the display unit from the front of the vehicle, and
a rim portion which is integrally provided at the housing main body on a rear side of the housing main body and forms the opening portion, and
an outer surface of the rim portion is formed to gradually turn toward the display unit side from the front of the vehicle toward the rear of the vehicle.

12. The rear view monitoring device according to claim 8, wherein the housing includes
a housing main body which covers the display unit from the front of the vehicle, and
a rim portion which is integrally provided at the housing main body on a rear side of the housing main body and forms the opening portion, and
an outer surface of the rim portion is formed to gradually turn toward the display unit side from the front of the vehicle toward the rear of the vehicle.

* * * * *